United States Patent [19]

Lang

[11] Patent Number: 5,524,117
[45] Date of Patent: Jun. 4, 1996

[54] MICROCOMPUTER SYSTEM WITH WATCHDOG MONITORING OF PLURAL AND DEPENDENT OVERLAPPING OUTPUT THEREFROM

[75] Inventor: Otto Lang, Munich, Germany

[73] Assignee: Siemens Aktiengesellschaft, Munich, Germany

[21] Appl. No.: 593,559

[22] Filed: Oct. 5, 1990

Related U.S. Application Data

[63] Continuation of Ser. No. 307,184, Feb. 2, 1989, abandoned, which is a continuation of Ser. No. 840,652, Mar. 18, 1986, abandoned.

[30] Foreign Application Priority Data

Mar. 22, 1985 [DE] Germany ............. 35 10 524.0

[51] Int. Cl.$^6$ ............................................. G06F 11/30
[52] U.S. Cl. ............. 371/62; 364/DIG. 1; 364/DIG. 2; 364/264; 364/267; 364/267.9
[58] Field of Search ............... 364/DIG. 1 MS File, 364/DIG. 2 MS File; 395/550, 800, 575; 371/16.3, 62

[56] References Cited

U.S. PATENT DOCUMENTS

| | | | |
|---|---|---|---|
| 3,474,414 | 10/1969 | Lenz | 371/62 |
| 3,934,131 | 1/1976 | Perschy | 371/62 |
| 4,072,852 | 2/1978 | Hogan et al. | 371/12 |
| 4,488,303 | 12/1984 | Abramovich | 371/62 |
| 4,528,629 | 7/1985 | Breitling | 371/62 |
| 4,538,273 | 8/1985 | Lasser | 371/12 |
| 4,584,645 | 4/1986 | Kosak | 371/14 |
| 4,586,179 | 4/1986 | Sirazi et al. | 371/12 |
| 4,594,685 | 6/1986 | Owens | 371/62 |
| 4,600,987 | 7/1986 | Nambudiri | 371/62 |
| 4,611,271 | 9/1986 | Hattori et al. | 371/12 |
| 4,635,258 | 1/1987 | Salowe | 371/16 |
| 4,670,676 | 6/1987 | Nishitani | 371/12 |
| 4,689,766 | 8/1987 | Kent | 364/900 |
| 4,696,002 | 9/1987 | Schleupen et al. | 371/12 |

FOREIGN PATENT DOCUMENTS

| | | | |
|---|---|---|---|
| 57-05158 | 1/1982 | Japan | 371/12 |
| 59-83438 | 5/1984 | Japan | 371/62 |

OTHER PUBLICATIONS

P. J. Veneziano "Pulse Checking Circuit." IBM Technical Disclosure Bulletin, vol. 9, No. 5 (Oct. 1966), p. 473.
Osborne 4 & 8–Bit Microprocessor Handbook, 5th ed. California, Osborne/McGraw–Hill, 1981. pp. (7—7)-(7–9).
Electronic Design, Jan. 18, 1977, pp. 90–92, "Watchdog Circuit Guard UP Systems Against Looping".
IBM Technical Disclosure Bulletin, vol. 7, No. 5, Oct. 1964, pp. 348–349, B. D. Pung & J. T. Forman, "Program Instruction Time Down Device".
IBM Technical Disclosure Bulletin, Vo. 26, No. 10A, Mar. 1984 pp. 5319–5320.
"Automatic Restart For Microprocessors", L. A. Blue, J. D. Laners, Jr. and R. G. Minor.
"Electronics & Wireless World", Oct. 1984, p. 33 ("Microprocessor Failure Detector"), Oldhill, Dunstable, Great-–Britain.
Patent Abstracts of Japan, Publications No. 58–129560 (A)
"Electronic Design" Jan. 18, 1977, pp. 90 and 92.

*Primary Examiner*—Robert B. Harrell
*Attorney, Agent, or Firm*—Hill, Steadman & Simpson

[57] ABSTRACT

A coincidence detecting circuit is connected to multiple output lines of the microprocessor, and for resetting a microprocessor in response to a nondetection of coincidence within a predetermined period. The time sequence of pulses on one of the lines is changed by lengthening the pulses so as to coincide with signals on other channels. The operating program of the microprocessor is altered, if necessary, so as to produce signals on plural channels having predetermined time relationships with each other.

5 Claims, 5 Drawing Sheets

MICROCOMPUTER SYSTEM WITH WATCHDOG MONITORING OF PLURAL AND DEPENDENT OVERLAPPING OUTPUT THEREFROM

This is a continuation, of application Ser. No. 307,184 now abandoned filed Feb. 2, 1989 which is a continuation of application Ser. No. 840,652, now abandoned, filed Mar. 18, 1986.

BACKGROUND

1. Field of the Invention

The present invention relates to apparatus for monitoring a microcomputer circuit, and more particularly to such a circuit which can detect and indicate the execution, by the microprocessor, of an erronous program sequence.

2. Prior Art

Microprocessor circuits are sometimes subject to external influences, which can result in a functional disruption of the operation or a condition which is sometimes referred to as a system falling asleep. When such disruptions occur, nearly unlimited number of false program sequences can take place, which may result in reprogramming interface circuits or ports, or timing circuits, etc., and can also modify data, turn off interrupts, etc. Any of these conditions can drastically affect the operation of the microcomputer system and subsequent operations. In addition, dislocation of the program counter can lead to false program sequences in which the microcomputer enters the wrong sequence, or an endless loop of instructions.

It is desirable to recognize such functional disturbances and to automatically eliminate them as much as possible. Circuits designed for this purpose are referred to as "watchdog" circuits.

Malfunctions in microcomputer systems used for remote control purposes can be particularly critical. Remote control substations are frequently difficult to access, so that malfunctions must be avoided insofar as possible. Yet remote control devices are particularly subject to line disruptions, network fades of brief duration, or strong electromagnetic noise fields. These disruptions can have a number causes, such as, for example, lightning, switching transients in electrical systems or tracks, etc.

The present invention is of the type which incorporates an evaluation device connected to a check pulse channel which monitors the generation of check pulses and emits a control signal if the sequence of check pulses deviates from a prescribed anticipated sequence. When this occurs, the microprocessor is reset, or an alarm condition is activated which signifies a trouble report. Such apparatus is disclosed in general in the periodical *Electronic Design*, Volume 2, Jan. 18, 1977, pages 90 and 92. The arrangement described there comprises a resettable counter which is triggered at a regular interval, during normal operation of the microcomputer. When the trigger pulses arrive on time, the counter is reset by each pulse, and prevents it from counting up to its full radix, which would result in restarting the microcomputer system. Since the time required for the counter to count to its full radix is greater than the normal pulse repetition time of the check pulse, the counter does not reach its full radix as long as correct operation continues. The check pulses are generated by software, controlled by the microprocessor, and are made available through an output interface arrangement or a port line. The check pulse channel is connected to the microprocessor by a capacitor.

In the periodical *Elektronik*, Volume 23, No. 16, November 1984, pages 120 and 121, apparatus is disclosed for self monitoring a microcomputer circuit having a watchdog circuit, as well as apparatus for under-voltage monitoring. The microprocessor is reset when necessary, by reset signals produced by the watchdog circuit or by the under-voltage monitor apparatus.

It has been determined that apparatus such as that described above does not completely exclude the possibility of a microcomputer system skipping into a incorrect program sequence, in which the single monitored port is driven periodically, so that the watchdog circuit cannot respond. It is therefore desirable to provide an apparatus and method for providing more reliable operation.

SUMMARY OF THE INVENTION

It is a principal object of the present invention to provide an apparatus and method for self monitoring of the microcomputer circuit such that the operation of the microprocessor in an erronous program sequence is detected with the greatest possible probability.

In accordance with one embodiment of the present invention, at least two check pulse channels are provided, together with apparatus for generating check pulses for supply to the check pulse channels. The groups of check pulses exhibit a predetermined time relation chronological allocation relative to each other. The evaluation apparatus contains a monitoring device for monitoring both the check pulses as well as the chronological allocation of the check pulses.

The present invention achieves the advantage of greatly reducing the probability that a faulty operating state of the microprocessor will go undetected. A significantly enhanced operating reliability is therefore achieved for devices in which monitored microcomputers are employed.

Comparison pulses may be generated in the evaluation apparatus, such pulses coinciding with the anticipated check pulses, at least in a chronological subrange, with the locally generated comparison pulses being supplied to a comparator which emits a fault signal when a deviation from the expected pulse sequence is recognized.

In a further embodiment of the invention, a circuit arrangement is provided so that the monitoring device contains a circuit for generating an acknowledgement signal at every reception of a group of check pulses which has the predetermined chronological allocation. The monitoring device also contains a timer circuit which is retriggerable by the acknowledgement signals. A retriggerable monostable flip-flop or a resettable or presettable counter serves as the retriggerable timer circuit. The individual pulses of the pulse sequences can follow each other with an equal spacing, or with a spacing which varies, as long as a prescribed chronological maximum spacing is not exceeded.

In the monitoring circuit, each check pulse group is monitored after conversion in the pulse converter circuit, for detection of the chronological allocation of the check pulses and the detection of their on-time arrival, which is monitored separately from the chronological allocation of the check pulses. This achieves the advantage that the check pulses are available for further evaluation if desired, at the output of the monitoring circuit, taking advantage of the fact that such check pulses are representative of the function of the circuit being monitored. The monitoring device of the present invention is composed of relatively simple subcircuits, which can be checked in turn, with simple measures.

Various possibilities are available for the chronological mutual allocation of the pulses of each check pulse group. In one arrangement of the present invention, which achieves an optimum simplicity, check pulses which normally chronologically overlap each other are checked for coincidence. In that case, when the circuit being monitored is operating normally, the check pulse channels carry pulse sequences having phase relationships such that the check pulses belonging to the same group of check pulses at least partially chronologically overlap and the monitoring circuit functions as a coincidence detector. These groups of check pulses are not required to be preconverted. The coincidence circuit can advantageously take the form of a simple AND or NOR gate.

Check pulses which do not chronologically overlap with each other can also be evaluated, particularly when such pulses are readily available in the circuit arrangement being monitored. Such check pulses can be supplied to an evaluation apparatus by a simple evaluation means so that, during normal operation of the circuit being monitored, the check pulse channels carry pulse sequences having phase relationships such that the check pulses belonging to one group appear without overlap, and the monitoring circuit contains a chain circuit having a pulse converter circuit and a coincidence circuit. The pulse converter circuit converts the pulses arriving without overlap into chronologically overlapping pulses. The pulse converter circuit is advantageously formed as a delay device for delaying the pulse, or as a pulse extension device for extending the duration of the pulse, and is preferably an edge-triggerable monostable flip-flop for at least one check pulse channel. The monostable flip-flop accomplishes an extension of the duration of the incoming pulses.

In another arrangement of the present invention, an arrangement is provided for inhibiting dc voltages in the transmission of the check pulses. This functions to eliminate faulty continuous potentials which may be present on the check pulse channels, for the evaluation of the check pulses. Appropriately dimensioned RC elements are used for this purpose.

In another arrangement of the present invention, a retriggerable timer circuit incorporates a pulse counter which has its clock input connected to a clock generator and which produces an output control signal when it reaches a predetermined state. The control signal is connected to apparatus which responds to such signal for inhibiting the clock signal supplied to the pulse counter. Thus, the state of the pulse counter is held static, in the case of a detected fault in the circuit being monitored, to furnish a static failure signal which is particularly useful for display purposes. No additional circuit components are necessary to produce such a static failure signal.

The microprocessor of the circuit being monitored is advantageously restarted by reset pulses, which are chronologically spaced so that the microprocessor is able, given correct start-up operation, to suppress the generation of subsequent reset pulses by triggering the timing circuit of the monitoring device. To this end, the reset input of the circuit being monitored is connected to an AND gate which has one input connected to the output of the clock generator and a further input connected to the output of the counter. A separate pulse generator preceding the pulse counter serves as the clock generator for the counter. A pulse sequence is thereby formed in response to the static output signal from the monitoring device, which cancells the static output signal, upon faultless start-up of the circuit being monitored.

A particularly far reaching detection of faulty operating states can be achieved in the case where the circuit being monitored consists of a microcomputer having a plurality of peripheral modules. In that case, a separate check pulse channel is connected to each individual peripheral module, so that all can be monitored.

These systems are particularly benefitted by the present invention since in these situations it is particularly important to reliably recognize a faulty operating status, and to provide a realiable automatic restart procedure.

The apparatus for self monitoring can be advantageously employed in remote control devices where great security against malfunctions is required, such as substations which are located remotely from a manned station.

BRIEF DESCRIPTION OF THE DRAWINGS

Reference will now be made to accompanying drawings in which.

DESCRIPTION OF THE PREFERRED EMBODIMENTS

Figure 1:
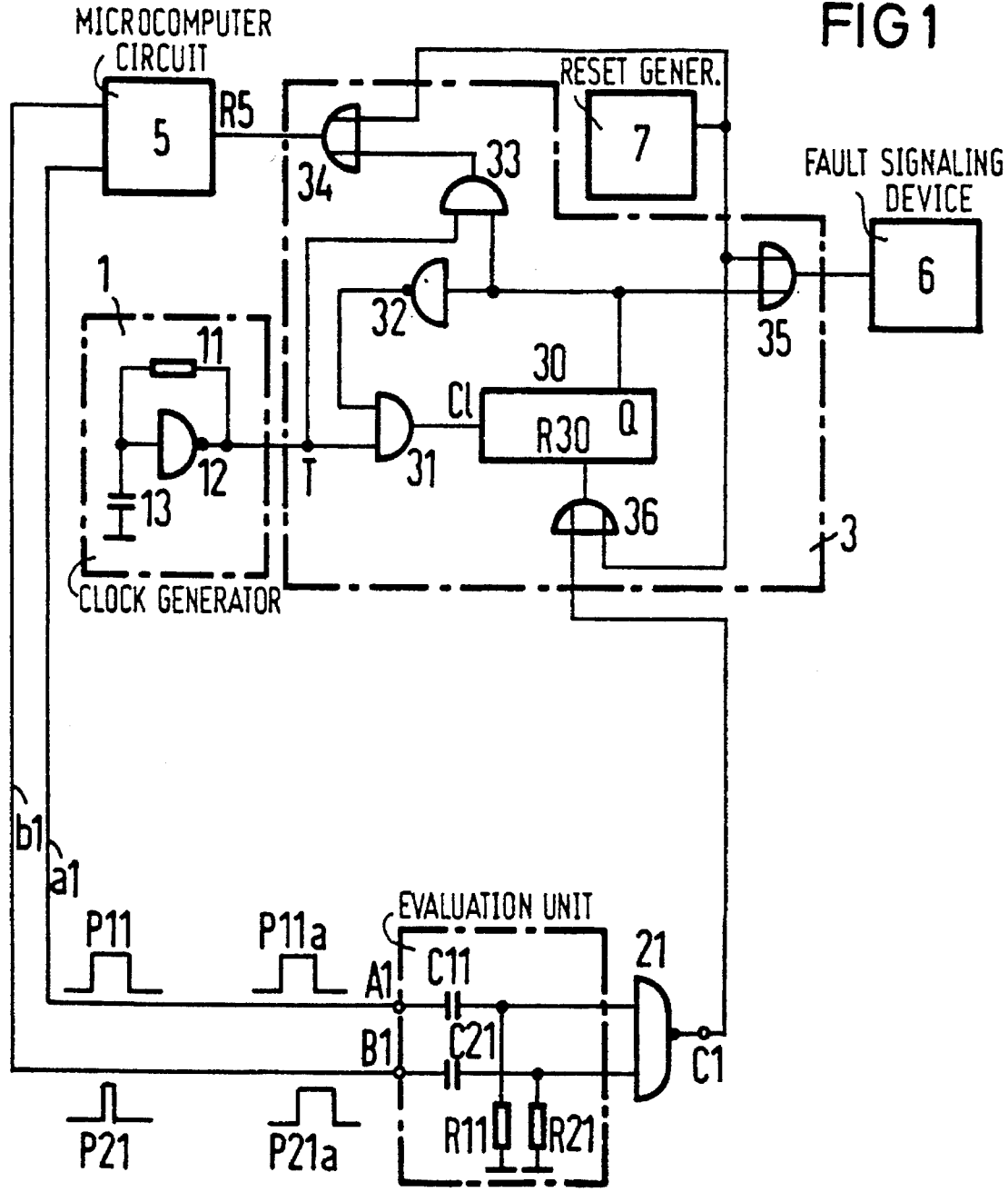
FIG. 1 is a functional block diagram, partly in schematic circuit diagram form, of an illustrative embodiment of the present invention.

Referring now to FIG. 1, a circuit 5 is being monitored, which is a microprocessor system which may incorporate a one-chip microcomputer. The circuit arrangement 5 periodically emits groups of check pulses to the two check pulse channels A1 and B1. Each pulse group contains one check pulse in each check pulse channel, which pulses have a defined chronological allocation relative to each other. Two groups of check pulses are shown in FIG. 1, one group containing pulses P11 and P21, and the other containing pulses P11a and P21a. The two pulses of each group must overlap. When one of the pulses is missing, or does not arrive at a time which overlaps with the other pulse of its pulse group, an error is recognized by a process which will now be described.

A clock generator 1 incorporates a RC element with a resistor 11 and a capacitor 13, and a Schmitt trigger 12, which is a preferably CMOS Schmitt trigger. It emits periodic clock pulses t at a frequency of for example 1 Hz. The clock pulses t are connected to the clock input C1 of a binary counter 30, through an AND gate 31. The counter 30 is countered upwardly until its output Q goes high, or switches to a logical "1". The Q output of the counter 30 is connected through an inverter 32 to the other input of the AND gate 31, so that the AND gate 31 is inhibited when the counter 30 counts up to the state which produces the Q output.

The Q output is connected through an OR gate 35 to the input of a fault signaling unit 6, and is also connected through an AND gate 33 and an OR gate 34 to the reset input R5 of the microprocessor circuit 5. The clock pulses t are connected to the second input of the AND gate 33, so that the output of the AND gate 33 is a series of clock pulses t, when the Q output of the counter 30 is high. During the interval during each clock cycle in which the clock pulse t is low or at logical "0", a low signal is supplied to the reset input R5, restarting the microprocessor circuit 5.

When the microprocessor circuit is started, and the circuit arrangement 5 operates correctly, then the groups of check pulses P11, P21 or P11a, P21a are generated in correct time relationship. When the two pulses of each group coincide, the AND gate 21 is enabled, since the two channels A1 and B1 are connected to the inputs of the AND gate 21. As a result, a pulse C1 is produced by the AND gate 81, which is connected to the reset input R30 of the counter 30 through an OR gate 36. This resets the counter 32 to its initial state, so that it begins another sequence of counting the clock pulses from its initial condition. With the reset of the counter 30, the Q output goes low, thus inhibiting the AND gate 33 and blocking further reset pulses from being applied to the reset terminal R5.

FIG. 1 illustrates the pulse shape of the check pulses P11–P21a. As illustrated, these pulses are normally low, but become high, switching to their logical "1" condition, when active. The AND gate 21 therefore serves as a coincidence circuit for the check pulses of the two channels A1 and B1. An RC circuit incorporating a capacitor C11 and a resistor R11 is connected between the channel A1 and an input of the AND gate 21, and a corresponding RC circuit incorporating a capacitor C21 and resistor R21 is connected between the channel B1 and the other input of the AND gate 21. The time constant of these RC circuits are sufficiently long that they do not modify the shape of the check pulses P1–P21a, but is chosen to be as small as possible without substantially modifying the shape of the pulses. The capacitors block dc voltages from the AND gate 21, and prevent the AND gate 21 from being triggered by static voltage levels of the channels A1 and B1. Thus when either or both channels assume a constant voltage level, the AND gate 21 cannot be triggered.

Figure 4:
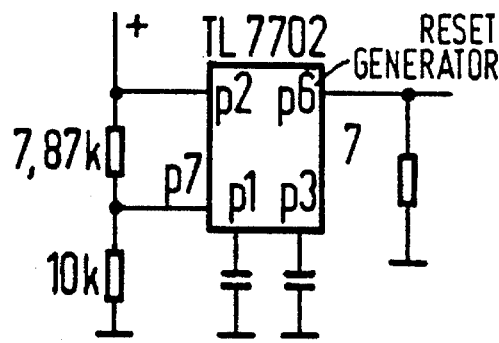
FIG. 4 is a schematic circuit diagram of a reset generator employed in the apparatus of FIG. 1.

The monitoring apparatus incorporates a reset generator 7 which may be, for example, a conventional logic chip model number TL7702, which is shown in detail in FIG. 4. When that chip is used, P7 of the reset generator 7 is connected to ground through a resistor having a value of 10 k ohms, with a resistor of 7.87 k ohms connected between pins P7 and P2. Pins P1 and P3 are each connected to the ground through a separate capacitor, and pin P6 of the reset generator 7 is connected to one input each of the OR gates 34, 35 and 36 (FIG. 1). A load resistor is connected between pin P6 and ground.

The reset generator 7 produces a reset pulse in response to application of power (at pin 2). When the system of FIG. 1 is first turned on, the rising voltage of the power supply triggers the reset generator 7 causing it to produce a positive going pulse at its output terminal connected to pin P6. This pulse is applied through the OR gate 34 to reset the microcomputer circuit 5, and also resets the fault signaling device 6 through OR gate 35, and the counter 33 through the OR gate 36. The reset generator causes system reset after an interruption of power such as a power outage or the like, as well as during initial turn-on of the apparatus.

Although a separate clock generator 1 is shown in FIG. 1, it will be understood that if the circuit 5 has an independent clock such as, for example, to generate a flashing clock for a visual display, then that source of clock pulses may be employed instead of using the independent clock generator 1. That may be done because such a clock functions completely independently of the operational program of the circuit 5, and is constantly available, even in periods of a software malfunction of the circuit 5.

Figure 2:
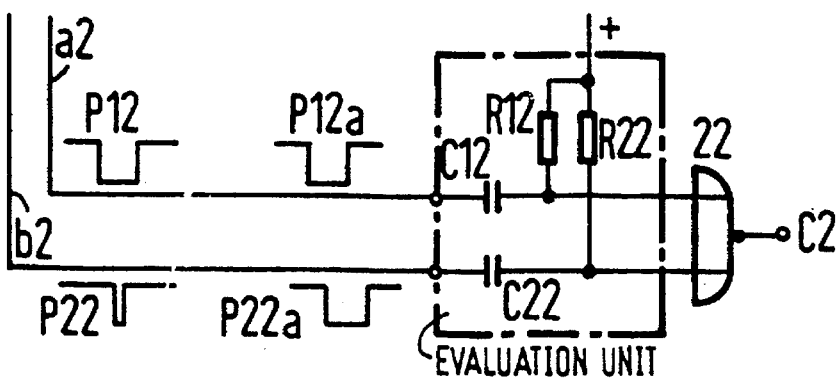
FIG. 2 is a schematic circuit diagram of a modification to the apparatus of FIG. 1, using a NOR gate.

FIG. 2 illustrates a schematic circuit diagram of a modification of FIG. 1, for use when the pulse groups have negative-going polarity as shown, instead of the positive-going polarity shown in FIG. 1. In FIG. 2, the channels A2 and B2 both are normally high or logic "1", and the pulse groups cause the voltage level to drop to the logical "0" level. In the circuit of FIG. 2, a NOR gate 22 is employed with its two inputs connected to the channels A2 and B2, with a pair of resistors R12 and R22 connected between the inputs of the NOR gate 22 and a source of positive potential. The inputs are connected to the channels A2 and B2 through capacitor C12 and C22, to block steady state voltage levels from the gate 22. In this circuit arrangement, the NOR gate 22 serves a coincidence circuit for combining the check pulses.

Figure 3:
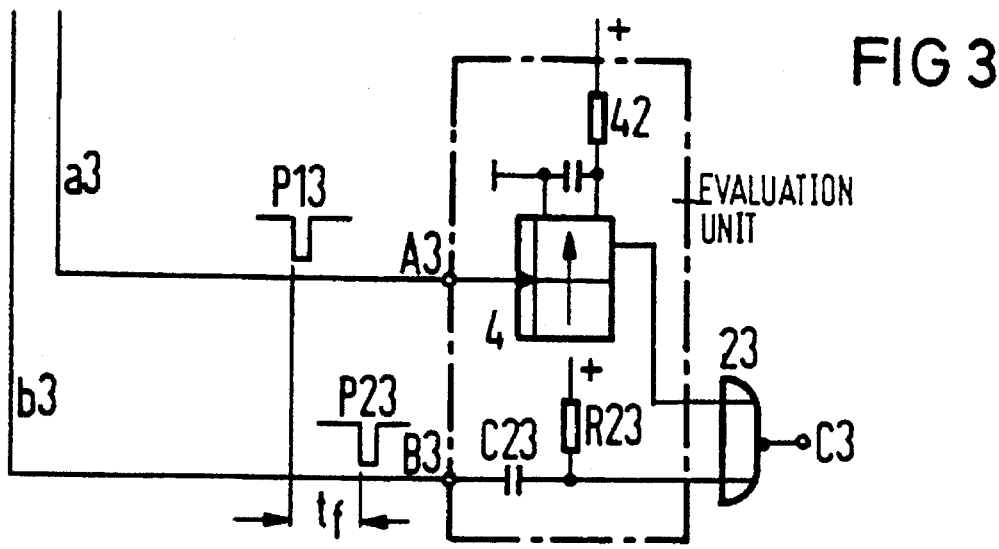
FIG. 3 is a schematic circuit diagram of a pulse converter which may be employed for check pulses which do not chronologically overlap.

FIG. 3 illustrates a circuit to be used in the system of FIG. 1 when the check pulses do not chronologically overlap, but rather appear in immediate succession. As shown in FIG. 3, the pulses P13 and P23 of a pulse group are separated by time TF. The channel A3 is connected to the input of a one-shot multivibrator 4, which is triggered by the negative-going pulse P13. Its output is made available to one input of the NOR gate 23, begining at the time of occurance of the pulse 13, and lasting for a duration controlled by the RC time constant of a RC circuit connected with the monostable multivibrator. The resistor 42 of this RC circuit is interconnected between the multivibrator 4 and the source of electric power, and changing the value of the resistor 42 enables the appropriate time constant to be selected for extension of the durations of the check pulses. Then the earlier occurring pulse B13 is delayed and so is to be coincident with the later occurring pulse P23, causing the NOR gate to produce a pulse which resets the counter 30 (FIG. 1).

The arrangements illustrated in FIGS. 1 to 3 may be employed using, for the A and B channels, terminals of the microprocessor system in which suitable pulse sequences already occur. That is, the channels A and B may be connected to terminals at which a pulse must arrive no later than after expiration of a prescribed time, and to another terminal at which pulses appear with a corresponding chronological allocation. Alternatively, the check pulse channels A and B can be connected to two or more freely programmable outputs or to two or more outputs of the circuit 5 which are already in use. It is possible also to use one output from a terminal which normally produces an output from the circuit 5, together with a freely programmable output or port.

When the circuit 5 to be monitored is the central station of a remote control system, for example, which produces output calls or interrogation messages at regular intervals, then a sequence of ready to send criteria can be employed as one check pulse sequence. In the case of the substation which transmits in response to a call, it is expedient to employ only terminals of freely programmable ports for the check pulse channels.

When at least one freely programmable port is employed in combination with an already utilized port, then it is expedient to connect one check pulse channel to a terminal at which strobe pulses for the activation of a peripheral module appear.

In a case in which pulse sequences with the desired chronological relationship do not already exist, the desired chronological allocation can be achieved by means of auxiliary programming of the microcomputer with the circuit 5, using standard measures conventionally used in the programming of an executive sequencer or the like.

It is advantageous to connect the check pulse channels to peripheral modules of a microcomputer system. In that case, the peripheral modules are incorporated into the self monitoring, and no freely programmable outputs of the microprocessor circuit 5 are required.

In a case where a one chip microcomputer is used, the ports of which can be optionally programmed as input or output parts (for example like the single chip model number 8051), two or more outputs can be employed for the check pulse sequences.

Figure 5:
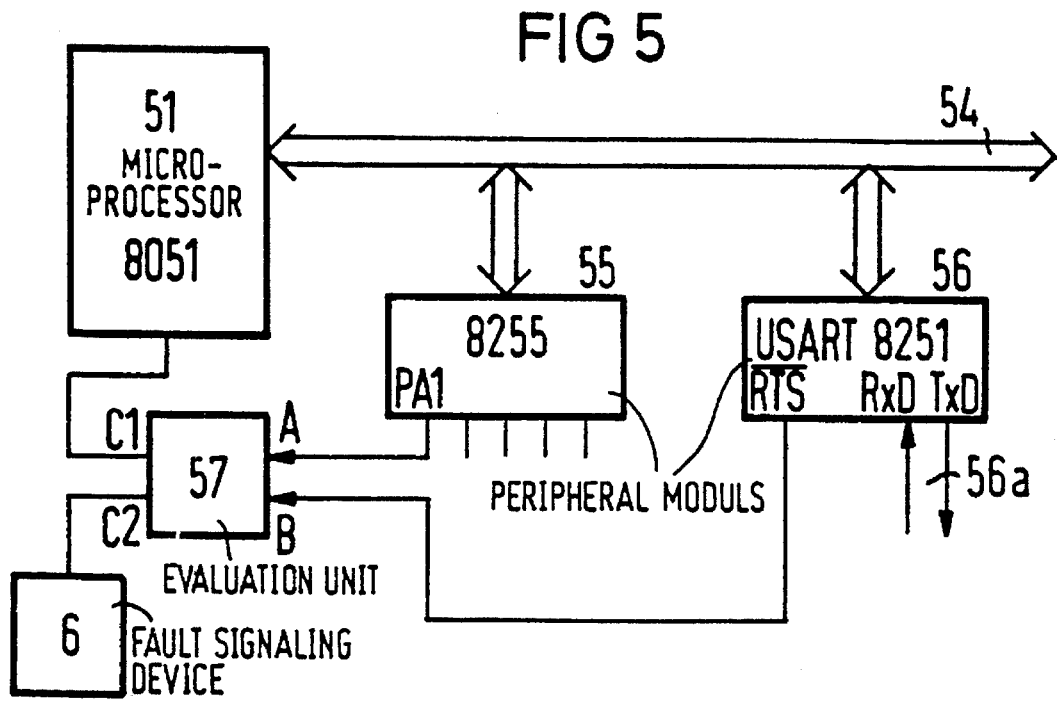
FIG. 5 is a functional block diagram showing the present invention connected with a circuit arrangement which is being monitored.

Referring to FIG. 5, a microcomputer system is illustrated incorporating a microprocessor 51 which may be, for example, the single chip microcomputer model number 8051. It is connected to a bus 54, by which it may communicate with the normal units of a microprocessor system, such a PROM, RAM, and peripheral modules such as the modules 55 and 56. A monitoring device 57 has its A input connected to an output PA1 of the peripheral module 55 which may be conveniently a single chip interface driver model number 8255, and its B input connected to the output RTS of a peripheral module 56, which may conveniently be a universal synchronous-ansychronous-receiver-transmitter.

The module 55 has peripheral outputs which represent a parallel interface. The terminal PA1 meets the requirement of the present invention that a pulse must arrive no later than after expiration of a prescribed time. The A input of the evaluation unit 57 is connected to this terminal.

The RTS output of the peripheral module 56 is connected to the B channel of the monitoring device 57. The control output RTS is freely programmable by the microprocessor 51, over the bus 54, and the B input of the evaluation unit 57 is connected to this freely programmable output. In the case of a fault recognized by the evaluation unit 57, an output signal is supplied via the output C1 to the reset input of the microprocessor 51, and an output signal is supplied via the output C2 to the fault signaling device 6.

When the system of FIG. 5 is designed as a remote control central or substation, the serial interface 56a leads to other facilities of the remote control network, via the conventionally used transmission devices.

In a central station, the parallel interface of the peripheral module 55 which supplies a parallel output serves, for example, for the connection of a lamp field or the like. In a substation for example, it serves for the connection of devices to be controlled.

Figure 6:
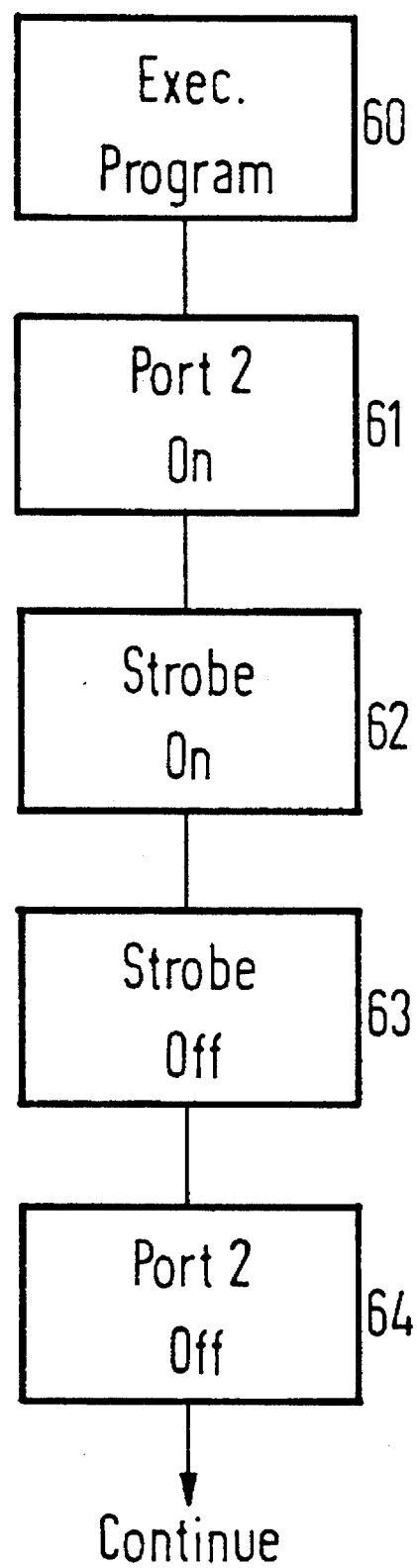
FIG. 6 is a flow chart illustrating cooperation of the invention with an executing program.
Figure 7:
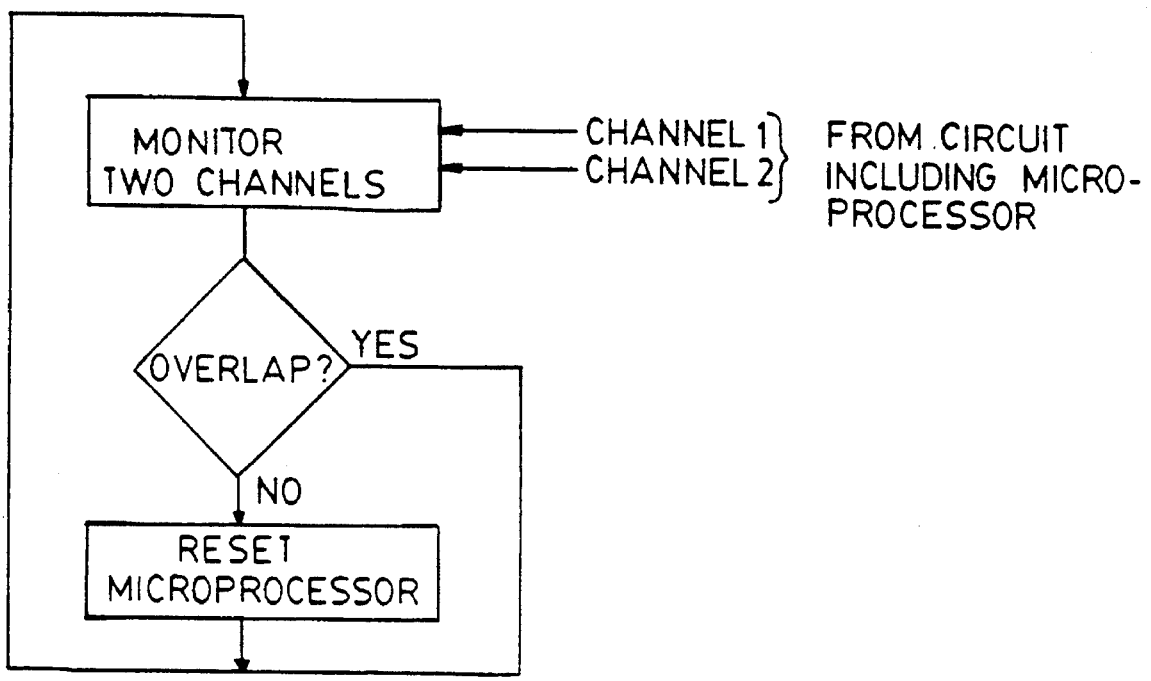
FIGS. 7–9 are flow charts illustrated the method of the present invention.
Figure 9:
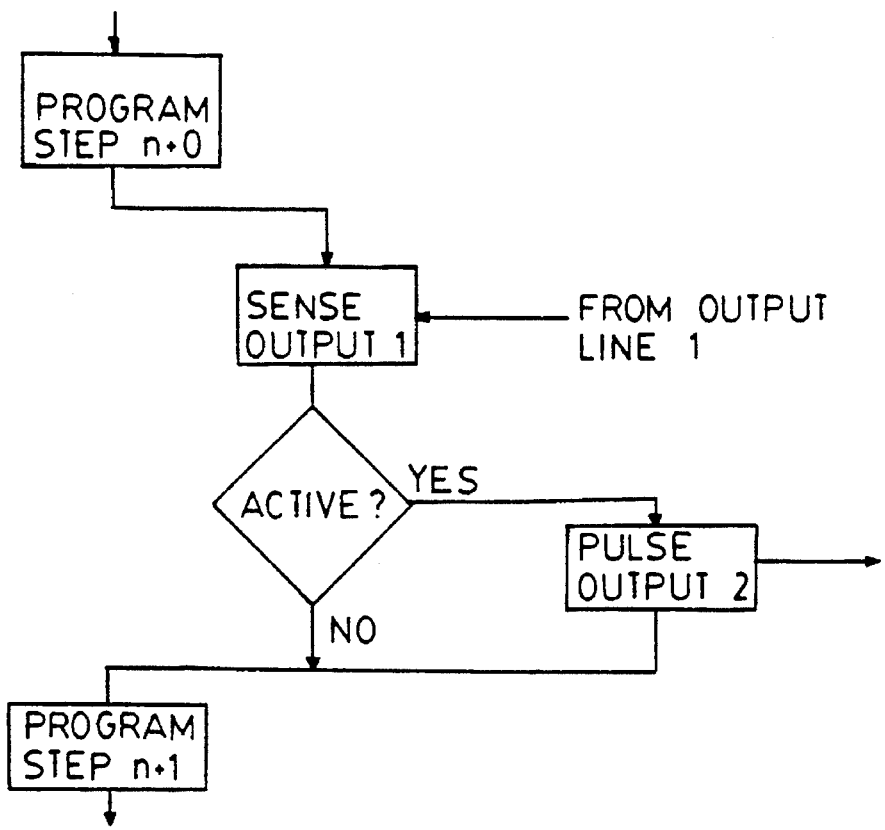
Figure 8:
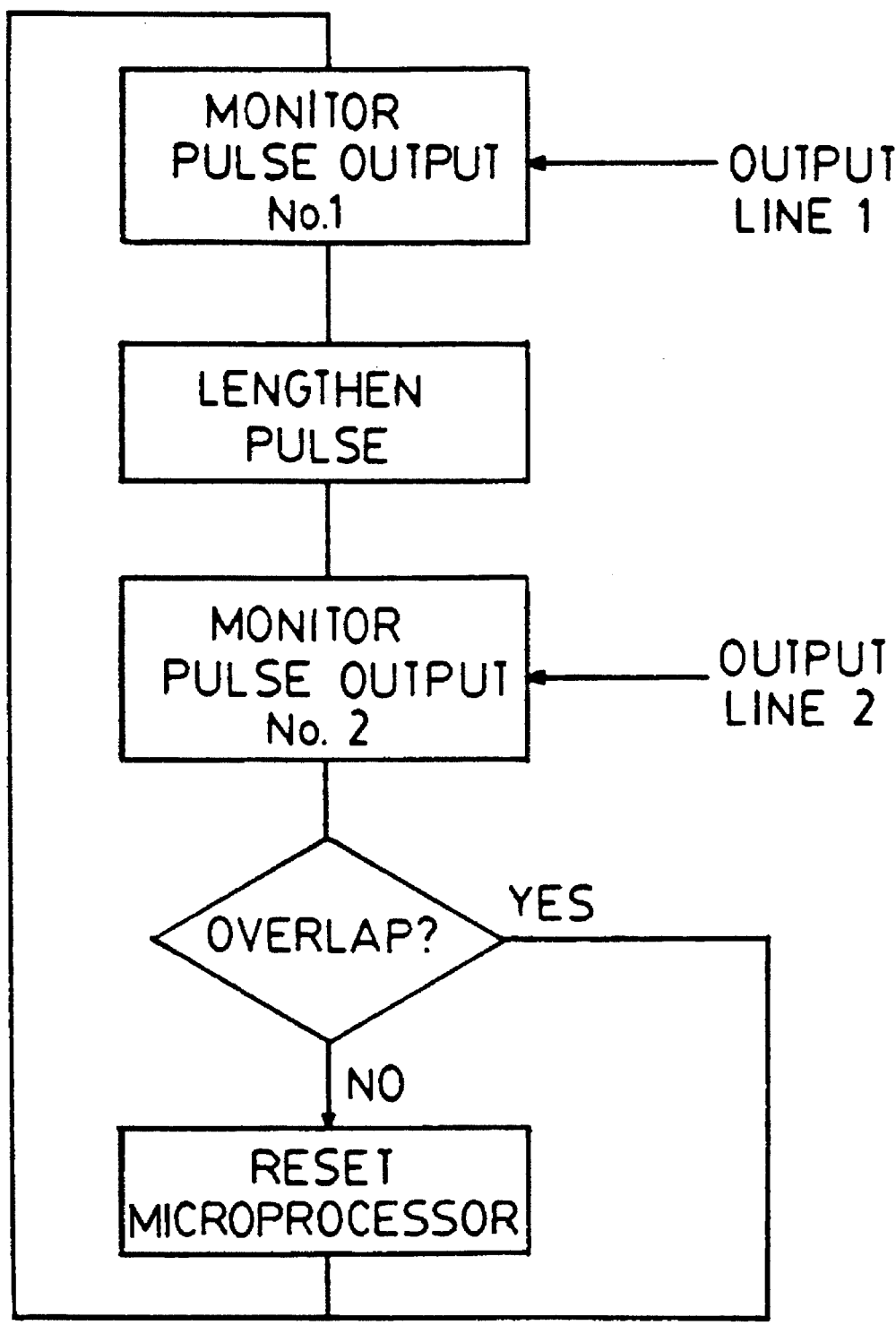

FIG. 6 illustrates how an executing program can cooperate with the apparatus of the present invention. Box 60 symbolizes the steps of an executing program. The program is designed to supply a strobe pulse periodically to a peripheral device, to poll the device for input, if any, or for some other function. In the regular course of the program's execution, control is passed to unit 62, which turns the strobe on, after which unit 63 receives control and turns the strobe off. The "units" are typically instructions of a stored program, but may be independent physical units, if desired.

The connecting line for the strobe pulse, in addition to being connected to the peripheral device, is also connected to channel a1 (FIG. 1). As shown in FIG. 6, before unit 62 receives control, the program sequence requires unit 61 to get control, which turns on at least one bit of a programmable port "Port 2". Unit 64 receives control from unit 63 and turns off the bit in Port 2, after which the program sequence continues normally. The bit of Port 2 controlled by units 61 and 64 is connected to channel b1 (FIG. 1) to supply the overlapping pulse. When the apparatus of FIG. 1 detects the overlapping pulses on the channels a1 and b1, there is a high degree of probability that such pulses were caused by units 61–64 in the regular program sequence, and not by an endless loop of instructions located randomly in memory to which the control has erroneously jumped. Were it not for the overlapping pulse supplied to Port 2, such an erroneous operation would not be detected.

When the operating program already has steps similar to the steps performed by units 61–64, no alteration of the executing program is necessary, and the relevant ports or lines are simply monitored. Otherwise, it is a simple matter to insert, by patches or the like, steps like those of units 61 and 64 to issue the production of pulses for a second channel, having a predetermined chronological relationship with naturally occurring pulses on another channel. Also, in a case where no output pulses are available with the requisite pulse repetition rate, the sequence of units 61–64 may be inserted at a convenient sequence in the executing program to cause the production of overlapping pulses whenever that sequence is executed. Periodic entry into this sequence may be assured by transferring control to the sequence periodically, for example, with a timer driven interrupt.

It is apparent from the foregoing that the present invention supplies a simple and efficient mechanism for monitoring the operation of microcomputer systems. Various additions or modifications may be made in the apparatus of the present invention without departing from the essential features of novelty thereof, which are intended to be defined and secured by the appended claims.

What is claimed is:

1. Apparatus for monitoring a circuit arrangement including a microprocessor, comprising a plurality of separate and independent check pulse channels, evaluation means connected to said check pulse channels, means connected to said channels for supplying, during fault-free operation of said microprocessor, check pulses of limited time duration to each of said check pulse channels in a predetermined sequence, said sequence normally causing said channels to produce a plurality of groups of pulses at different times with the check pulses on one channel being in predetermined time relationship with the check pulses on another channel of said plurality of channels, said evaluation means being connected to said channels for receiving said groups of pulses and for generating an acknowledgement signal pursuant to each group of received check pulses which has said predetermined time relationship, and including a timer circuit responsive to said acknowledgement signal and connected to said evaluation means for producing a reset output, and means connected to said reset output for resetting said microprocessor, wherein resetting of said microprocessor is prevented only when said check pulses indicate normal operation of all of said pulse channels at about the same time, wherein said evaluation means includes a pulse counter connected to receive pulses from a clock generator, and producing an output signal when said counter reaches a predetermined counting state, and means connected to said output signal for inhibiting the further counting of said counter.

2. Apparatus according to claim 1, wherein said evaluation means includes an AND gate having one input connected to a source of clock pulses and another input connected to the output of said counter, and said AND gate's output connected to supply said reset output.

3. A machine executed method of monitoring operation of a circuit arrangement including a microprocessor, including the steps of normally causing, during fault-free operation of said microprocessor, two separate and independent output channels of said microprocessor to each produce pulse signals of limited time duration, and for resetting said microprocessor when said channels do not both manifest said pulse signals with the signals on one channel having a predetermined time relationship to the signals on the other channel, whereby resetting of said microprocessor is prevented only when said pulse signals on both channels indicate normal operation thereof at about the same time, including the step of altering the time duration of pulses on one of said channels so that pulses on said one channel having a predetermined time relationship with signals on the other channel are lengthened so as to overlap the signals on said other channel.

4. Apparatus according to claim 1, wherein said converter means comprising an edge-triggerable one-shot multivibrator responsive to the pulses on said one channel, whereby the pulses on said one channel are reshaped so that they are at least partially coincident with corresponding pulses on a different channel.

5. Apparatus for monitoring a circuit arrangement including a microprocessor, comprising a plurality of separate and independent check pulse channels, evaluation means connected to said check pulse channels, means connected to said channels for supplying, during fault-free operation of said microprocessor, check pulses of limited time duration to each of said check pulse channels in a predetermined sequence, said sequence normally causing said channels to produce a plurality of groups of pulses at different times with the check pulses on one channel being in predetermined time relationship with the check pulses on another channel of said plurality of channels, said evaluation means being connected to said channels for receiving said groups of pulses and for generating an acknowledgement signal pursuant to each group of received check pulses which has said predetermined time relationship, and including a timer circuit responsive to said acknowledgement signal and connected to said evaluation means for producing a reset output, and means connected to said reset output for resetting said microprocessor, wherein resetting of said microprocessor is prevented only when said check pulses indicate normal operation of all of said pulse channels at about the same time, wherein said supplying means includes means for producing pulses on said channels which are separated in time, and including converter means connected to one of said channels to convert pulses on said one channel into pulses which overlap the pulses on the other said channel.

* * * * *